Patented June 3, 1941

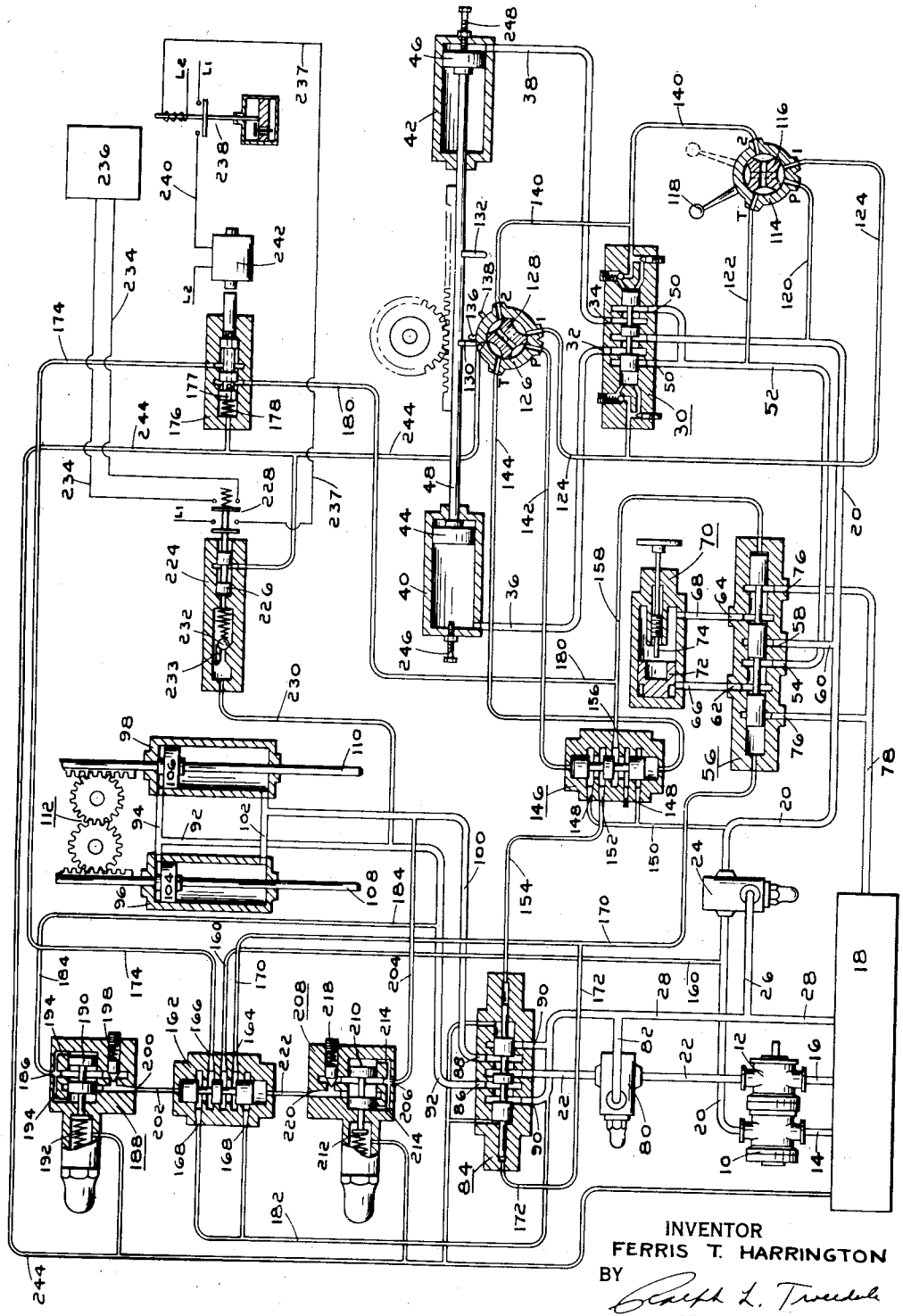

2,244,006

UNITED STATES PATENT OFFICE 2,244,006

POWER TRANSMISSION

Ferris T. Harrington, Detroit, Mich., assignor to Vickers Incorporated, Detroit, Mich., a corporation of Michigan Application November 7, 1938, Serial No. 239,308

4 Claims. (Cl. 219—4)

This invention relates to power transmissions, particularly to those of the type comprising two or more fluid pressure energy translating devices one of which may function as a pump and another as a fluid motor.

The invention more particularly relates to spot welders wherein a transmission of this type may be used to automatically feed the work and perform the welding operations thereon.

An object of this invention is to provide means for causing the welding operations to occur at equal intervals on a work piece and means for feeding the work in one direction for a predetermined distance after each welding operation to position it for the next operation.

Another object is to use the return stroke of the work feeding mechanism to feed another piece of work to be welded.

Still another object is to provide means for automatically stopping the machine after a piece of work has been finished and a means for stopping the machine in an emergency.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission incorporating the preferred form of the present invention.

A pump 10 and a pump 12, both of which may be of the fixed displacement type and driven by a prime mover such as an electric motor not shown, have suction conduits 14 and 16 respectively through which fluid may be withdrawn from a tank 18 and delivery conduits 20 and 22. The conduit 20 extends to a relief valve 24 which is adapted to bypass fluid from the conduit 20 to the tank through a conduit 26 and a conduit 28 whenever a predetermined safe pressure is exceeded in the conduit 20. From valve 24 conduit 20 extends to the pressure port of a pilot-operated four-way valve 30. The valve 30 has cylinder ports 32 and 34 which are connected by conduits 36 and 38 to the head ends of cylinders 40 and 42 respectively. A piston 44 in cylinder 40 and a piston 46 in cylinder 42 are both rigidly mounted on a piston rod 48. The rod 48 may be connected to operate a reciprocating work carrier to shift the work into various positions with respect to the tools carried by the piston rods 108 and 110. The four-way valve 30 also has ports 50 which are connected by a conduit 52 to a port 54 of a pilot-operated six-way valve 56. A port 58 of valve 56 is connected to the pressure line 20 by a conduit 60. The valve 56 has ports 62 and 64 which are connected by conduits 66 and 68 respectively to the opposite ends of a volumetric displacement metering cylinder 70. A piston 72 is slidably mounted in cylinder 70. An adjustable stop 74 is provided to regulate the effective stroke of the piston 72. The valve 56 also has ports 76 which are connected to the tank by a conduit 78.

The delivery conduit 22 of pump 12 extends to a relief valve 80 which is connected to the tank by a conduit 82 and conduit 28. From valve 80 the conduit 22 extends to the pressure port of a pilot-operated four-way valve 84. Valve 84 has cylinder ports 86 and 88 and tank ports 90. Port 86 is connected by a conduit 92 to a conduit 94 which opens to the head ends of two cylinders 96 and 98. Port 88 is connected by a conduit 100 to a conduit 102 which opens to the rod ends of the two cylinders 96 and 98. Slidably mounted in cylinders 96 and 98 are pistons 104 and 106 mounted on piston rods 108 and 110 respectively and adapted to carry the usual welding electrodes or tools. A rack and pinion mechanism 112 is employed to maintain pistons 104 and 106 constantly in step. The tank ports 90 of valve 84 are connected to the tank by conduit 28.

A pilot valve 114 has a valve member 116 whose position is controlled by a hand lever 118. Valve 114 has a pressure port P, a tank port T and delivery ports 1 and 2. The port P is connected to the pressure conduit 20 by a conduit 120. The port T is connected to the conduit 52 by a conduit 122. A conduit 124 extends from port 1 of valve 114 to the left-hand pilot connection of the valve 30. The conduit 124 also extends to a port 1 of a pilot valve 126 which has a valve member 128. Dogs 130 and 132 carried on rod 48 are adapted to engage the arms 136 and 138 of valve 126 respectively. The arms 136 and 138 control the position of the valve member 128. The port 2 of valve 114 is connected by a conduit 140 to the right-hand pilot connection of valve 30. The conduit 140 also extends to a port 2 of the valve 126.

Valve 126 has ports P and T respectively connected by conduits 142 and 144 to the upper and lower pilot connections of a pilot-operated four-way valve 146. The valve 146 has ports 148 which are connected to the pressure conduit 28 by a conduit 150. A port 152 of valve 146 is connected by a conduit 154 to the right-hand pilot connection of valve 84 and a port 156 of valve 146 is connected to the right-hand pilot connection of valve 56 by a conduit 158.

A conduit 160 connects the pressure conduit 20 to the pressure port of a pilot-operated four-way valve 162. The valve 162 also has ports 164, 166 and 168. The port 164 connects by means of a conduit 170 to the left-hand pilot connection of valve 56. A conduit 172 extends from conduit 170 to the left-hand pilot connection of valve 84. A conduit 174 extends from port 166 of valve 162 to one of the ports of a solenoid-operated two-way valve 176, the spool of which is normally held in its right-hand position by a spring 178. Another port of valve 176 is connected by a conduit 180 to the conduit 158. The ports 168 of valve 162 are connected to the tank conduit 28 by a conduit 182.

A conduit 184 extends from conduit 92 to a port 186 of a bypass valve 188. The spool 190 of valve 188 is normally held in its right-hand position by a spring 192. A passage 194 connects the port 186 to the opposite ends of the bore of spool 190. Due to the differential area at the two ends of spool 190 the pressure in conduit 184 is effective to react against spring 192 and open the valve when a predetermined pressure is reached in conduit 184. A check valve 198 permits free flow from a port 200 to the port 186. The port 200 is connected by a conduit 202 to the upper pilot connection of valve 162.

A conduit 204 extends from conduit 100 to a port 206 of a bypass valve 208 which is the same as valve 188 and has a spool 210 normally held to the right by a spring 212. A passage 214 connects the port 206 to the right and left ends of the bore of valve 208. A check valve 218 permits free flow from a port 220 to port 206 of valve 208. Port 220 connects by a conduit 222 to the lower pilot connection of valve 162. A pressure responsive switch 224 having a piston 226 adapted to operate a two-circuit electric switch 228 is connected to conduit 92 by a conduit 230. A check valve 232 permits free flow of fluid from conduit 230 while a restricted passage 233 serves to provide a dashpot action on the return movement.

An electrical conductor 234 extends through switch 228 to an electric control panel 236 to provide a circuit for controlling the current to perform welding operations. The control panel may be of any suitable type which is effective to cause the welding current to flow for a predetermined interval after the controller is rendered effective by the closing of the circuit 234. The other circuit of switch 228 connects one side of the line L¹ by means of a conductor 237 to the operating coil of a time delay relay 238 and then to the other side of the line L². The single controlled circuit of relay 238 connects the line L¹ by a conductor 240 to a solenoid 242, adapted to operate valve 176, and then to the line L².

Valves 126, 176, 188, 208 and 84 and switch 224 are provided with a drain conduit 244. The valve 176 has a central bore 177 in its spool which normally connects conduit 244 to the conduit 180 when the spool is in its right-hand position, illustrated. Stops 246 and 248 in cylinders 40 and 42 respectively are provided to adjust the limits of travel of pistons 44 and 46 for different lengths of work that are to be welded.

Before describing the operation of the machine through a normal cycle, the at-rest condition of the circuit may be set forth as follows:

With the parts in the positions shown in the drawing and the pumps 10 and 12 operating, fluid is drawn from the tank 18 through conduit 14 by pump 10 and delivered through conduit 20 to the pressure port of four-way valve 30. Fluid passes through valve 30 and out of port 32 and by means of conduit 36 to the head end of cylinder 40. As the pistons 44 and 46 are in their extreme right hand limit of travel, which is adjustable by stop 248, they do not move.

Fluid is delivered from the pressure conduit 20 through conduit 120 to port P of valve 114. The fluid passes from port 1 through conduit 124 to the left hand pilot connection of valve 30. Conduit 124 also delivers fluid to port 1 of valve 126 and out of port T to conduit 144 which directs the fluid to the lower pilot connection of four-way valve 146. The conduit 150 delivers pressure fluid from conduit 20 to the ports 148 of valve 146. As the spool of valve 146 is in its upper position, port 148 is connected to port 152. Conduit 154 delivers fluid from port 152 to the right-hand pilot connection of four-way valve 84. Since both valves 146 and 84 are already in their upwardly and left-hand shifted positions, respectively, the only path of escape of the fluid delivered by pump 10 is to pass through the relief valve 24 through conduits 26 and 28 to the tank.

The pump 12 draws fluid from tank 18 through conduit 16 and delivers it through conduit 22 to the pressure port of valve 84. The spool of valve 84 being in its left-hand position, conduit 22 is connected to the port 88. Accordingly fluid is delivered from conduit 22 to conduit 100 and through conduit 102 to the rod ends of the cylinders 96 and 98, thereby causing the pistons 104 and 106 to remain in their upper position. The pistons 104 and 106 being stalled, pressure will build up in conduit 100. The pressure fluid in conduit 100 passes through conduit 204 to port 206 of valve 208. Passage 214 of valve 208 passes pressure fluid from port 206 to the right and left hand ends of spool 210 respectively, thereby moving the spool 210 to the left against the resistance of spring 212.

The ports 206 and 220 of valve 208 now being connected, fluid is passed to the lower pilot connection of valve 162 by conduit 222, thereby holding the spool of valve 162 in its upper position.

Pressure fluid passes from conduit 20 through conduit 160 to the pressure port of four-way valve 162. The port 164 now being in communication with the pressure port, fluid is delivered by conduit 170 to the left-hand pilot connection of valve 56 holding the spool of the latter in its right-hand position. The conduit 172 delivers fluid from conduit 170 to the left-hand pilot connection of valve 84. The spool of valve 84, however, does not move because an equal pressure is acting on the opposite end of it. Since there is no further escape for the fluid delivered by pump 12 the pressure builds up to open relief valve 80 and bypass the pump delivery to the tank through conduits 82 and 28.

From the foregoing it will be seen that the machine is at rest, with none of the pistons or valves moving.

In order to start a working cycle the valve member 116 of pilot valve 114 is rotated clockwise by lever 118 connecting port P to port 2. Pressure fluid in conduit 20 accordingly passes through conduit 120, ports P and 2 of valve 114, conduit 140 to the right-hand pilot connection of four-way valve 30. The spool of valve 30 is then shifted to the left which connects the pressure port to port 34. Pressure fluid now being delivered from port 34 of valve 30 and through conduit 38 to the head end of cylinder 42, pistons 46 and 44 accordingly move to the left. When the spool of valve 30 was shifted port 32 was connected to tank port 50. Fluid in the head end of cylinder 40 passes through conduit 36, ports 32 and 50 of valve 30, conduit 52, ports 54 and 62 of valve 56, and conduit 66 to the left end of the metering cylinder 70. As the exhaust fluid from cylinder 40 enters cylinder 70 the piston 72 moves to the right until it comes up against stop 74. When the piston 72 stalls it blocks the exhaust fluid from cylinder 40. Therefore the distance of travel of the pistons 44 and 46 is determined by the travel of piston 72 which is adjustable by stop 74. This movement of pistons 44 and 46 is only a fraction of their total possible travel permitted by the limit stops 246 and 248.

Fluid in the right end of cylinder 70 passes to the tank through conduit 68, ports 64 and 76 of valve 56 and conduit 78. The same pressure fluid in conduit 140 that shifted valve 30 is delivered to port 2 of pilot valve 126 which directs the fluid from port P and through conduit 142 to the upper pilot connection of valve 146. The spool of valve 146 accordingly shifts downwardly cutting off the pilot pressure that was holding the spool of valve 84 to the left and connecting port 152 to the tank through port 156, conduit 180, valve 176 and conduit 244. The pilot pressure that is on the left hand pilot connection of valve 84, as previously described, now shifts the spool of valve 84 to the right, connecting its pressure port to port 86 and port 88 to the tank port 90.

Pressure fluid in conduit 22 is now directed to port 86 of valve 84, through conduits 92 and 94 to the head ends of cylinders 96 and 98. The pistons 104 and 106 move downwardly carrying rods 108 and 110 to perform a welding operation on the work which was fed into position by the movement of pistons 44 and 46. Exhaust fluid from the rod ends of cylinders 96 and 98 passes into conduit 102, conduit 100, ports 88 and 90 of valve 84, and conduit 28 to the tank. When the pistons 104 and 106 stall against the work, pressure will build up in conduit 92. Pressure fluid in conduit 92 passes through conduit 184 to the port 186 of valve 188 and acts on both ends of spool 190 through passage 194, shifting spool 190 to the left against the resistance of spring 192, thereby connecting port 186 to port 200. Fluid then passes out of port 200 and through conduit 202 to the upper pilot connection of four-way valve 162 shifting the spool of the latter downwardly. The fluid below the spool of valve 162 passes through conduit 222, port 220 of valve 208, check valve 218, port 206, and conduit 204 to the conduit 100 which is open to the tank.

Pressure fluid in conduit 20 passes through conduit 160 to the pressure port of valve 162. The spool of valve 162 being down, the pressure port is connected to port 166 which delivers fluid through conduit 174 to valve 176 where it is blocked, for the time being.

At the same time that pressure increased in conduit 184 the same thing occurred in conduit 230. Pressure fluid in conduit 230 passes through the check valve 232 to move the piston 226 of switch 224 to the right which closes the two-circuit switch 228. The circuit 234 is made, which extends to the electric panel 236, to initiate an impulse of welding current. The other circuit of switch 228 connects the line L¹ by conductor 237 to the operating coil of time delay relay 238, thence to the line L².

After sufficient time has passed for welding, the single circuit of relay 238 is closed, connecting the line L¹ by a conductor 240 to energize solenoid 242, thence to line L². The solenoid 242 moves the spool of valve 176 to the left against resistance offered by spring 178, connecting conduit 174 to conduit 180.

There being pressure fluid in conduit 174 as previously described, it now passes through valve 176, conduit 180 and conduit 158 to the right-hand pilot connection of valve 56, the spool of which shifts to the left. The ports 58 and 64 of valve 56 now being connected, pressure fluid from conduit 20 passes through conduit 60, ports 58 and 64 and conduit 68 to the right end of metering cylinder 70. The piston 72 accordingly moves to the left to reset itself for the next advance of pistons 44 and 46. Fluid in the left end of cylinder 70 passes through conduit 66, ports 62 and 76 of valve 56 and conduit 78 to the tank.

Pressure fluid in conduit 158 is also directed to the port 156 of valve 146, the spool of which is in its down position, out port 152 and through conduit 154 to the right-hand pilot connection of valve 84 thereby shifting its spool to the left. Fluid from the left end of the valve 84 passes to the tank by conduit 172, conduit 170, ports 164 and 168 of valve 162, conduit 182 and conduit 28. The pressure port of valve 84 now being connected to port 88, pressure fluid is delivered from conduit 22 to conduit 100 and from there by conduit 102 to the rod ends of cylinders 96 and 98 causing the pistons 104 and 106 to move upwardly and away from the work.

When the valve 84 was shifted to the left conduit 230 was opened to the tank through conduit 92, ports 86 and 90 of valve 84 and conduit 28 thereby opening switch 228 to shut off welding current and to break the circuit 237 of relay 238 which in turn deenergized solenoid 242 allowing valve 176 to return to its normal position as shown.

When the pistons 104 and 106 return to their uppermost position, pressure builds up in conduit 100 and is transmitted through conduit 204 to port 206 of valve 208. As previously described the pressure fluid in passage 214 shifts spool 210 to the left, opening port 206 to port 220. Fluid is delivered from port 220 and through conduit 222 to the lower pilot connection of valve 162, the spool of which is shifted upwardly. Fluid in the upper end of valve 162 is passed to the tank by conduit 202, port 200, check valve 198 and port 186 of valve 188, conduit 184, conduit 92, ports 86 and 90 of valve 84, and conduit 28.

Pressure fluid in conduit 20 is now delivered through conduit 160, the pressure port of valve 162, port 164, and conduit 170 to the left-hand pilot connection of valve 56. Accordingly the spool of valve 56 shifts to the left.

Fluid in the right end of valve 56 passes to the tank by conduit 158, conduit 180, passage 177 of valve 176, and conduit 244.

The machine is now ready to automatically start another operation as has just been described. The metering cylinder 70 permits pistons 44 and 46 to advance another step to the left and the same cycle of operations is repeated.

This action will continue until piston 44 moves against stop 246.

As the piston 44 moves against stop 246, dog 132, carried on rod 48, moves lever 138 to rotate valve member 128 of valve 126 in a counter-clockwise direction. So with valve 114 in its clockwise position, the machine is stopped as will now be described.

Pressure fluid in conduit 20 passes through conduit 120, ports P and 2 of valve 114, and conduit 140 to hold the spool of valve 30 to the left. Conduit 140 also delivers fluid through ports 2 and T of valve 126, conduit 144 to the lower pilot connection of valve 146, shifting the same upward. Pressure fluid is then directed from conduit 20 through conduit 150, ports 148 and 152 of valve 146, and conduit 154 to the right-hand pilot connection of valve 84 thereby holding the spool of valve 84 to the left.

Therefore, with valves 30 and 84 in the positions just described, pressure fluid will be delivered to the head end of cylinder 42 and to the rod ends of cylinders 96 and 98. The machine is accordingly brought to rest with the pistons 44 and 46 at their extreme left limit of travel and pistons 104 and 106 in their uppermost positions.

In order to start another series of operations in the opposite direction the lever 118 of valve 114 is moved in a counter-clockwise direction connecting ports P to 1. Pressure fluid is then delivered through conduit 124 to the left-hand pilot connection of valve 30, shifting its spool to the right. Accordingly fluid is delivered through conduit 36 to the head end of cylinder 40, causing pistons 44 and 46 to move to the right for a distance governed by metering cylinder 70. A similar cycle of operations will now take place, identical to that previously described except that pistons 44 and 46 are moving to the right in step-by-step fashion, between cycles of advance and return of the welding pistons 104 and 106.

An emergency stop is provided for stopping the machine while pistons 44 and 46 are between their limits of travel. Assuming that valves 116 and 126 are in their counter-clockwise position with the pistons 44 and 46 traveling to the right somewhere between their limits of travel and it is desired to stop the machine, the lever 118 of valve 114 is moved in a clockwise direction. Pressure fluid is then directed out of port 2 of valve 114 and through conduit 140 to shift the spool of valve 30 to the left. Fluid is also directed from conduit 140 to port 2 of valve 126 and out of port T to the lower pilot connection of valve 146 through conduit 144. The spool of valve 146 now being in its upper position, pressure from valve 176 passing through conduit 180 is blocked, from reaching the right-hand pilot connection of valve 84, at port 156 of valve 146.

As pressure fluid is being delivered through conduit 38 from valve 30, pistons 44 and 46 will now move to the left to the point where metering piston 72 abuts stop 74. Since pilot pressure to shift valve 84 and raise pistons 104 and 106 is blocked at port 156 of valve 146, the pistons 104 and 106 will stop. Because the action of pistons 104 and 106 controls the movement of pistons 44 and 46, the latter will also stop.

As pistons 44 and 46 reach their extreme right-hand position, dog 130 on rod 48 will move lever 136 to rotate valve member 128 of valve 126 in a clockwise direction and stop the machine in the same manner as when it was traveling to the left.

While the form of embodiment of the invention as herein disclosed constitutes a preferred form, it is to be understood that other forms might be adopted, all coming within the scope of the claims which follow.

What is claimed is as follows:

1. In a hydraulic power transmission system adapted to operate a spot welding machine the combination of a fluid motor for advancing and retracting a welding tool, a fluid motor for advancing a work carrier in forward and reverse directions relative to the tool, pump means for supplying fluid to operate said motors, control means for causing repeated advance and return cycles of the tool operating motor, and control means including a volumetric displacement metering device for causing actuation of the work carrier motor in a step-by-step fashion and including means responsive to pressure built up at the end of a stroke of the tool operating motor for resetting said metering device.

2. In a hydraulic power transmission system adapted to operate a spot welding machine the combination of a fluid motor for advancing and retracting a welding tool, a fluid motor for advancing a work carrier in forward and reverse directions relative to the tool, pump means for supplying fluid to operate said motors, control means for causing repeated advance and return cycles of the tool operating motor, control means including a volumetric displacement metering device for causing actuation of the work carrier motor in a step-by-step fashion, means responsive to travel of the work carrier motor through a predetermined distance for stopping further actuation of said motors, and means for reversing the direction of travel of the work carrier motor, said reversing means being interconnected with the stopping means to render the latter ineffective by shifting said reversing means.

3. In a hydraulic power transmission system adapted to operate a spot welding machine the combination of a fluid motor for advancing and retracting a welding tool, a fluid motor for advancing a work carrier relative to the tool, pump means for supplying fluid to operate said motors, and electric controller for initiating and terminating the flow of welding current, control means for causing advancing and retracting strokes of the tool operating motor, said control means including pressure responsive means for initiating operation of the electric controller after a predetermined pressure is built up on the advancing stroke of the tool operating motor, pressure responsive time delay means for thereafter reversing the flow to the tool operating motor to initiate the retracting stroke, and means rendered operative by the tool operating motor for controlling the flow to the work carrier motor to initiate an advancing stroke thereof.

4. In a hydraulic power transmission system adapted to operate a spot welding machine the combination of a fluid motor for advancing and retracting a welding tool, a fluid motor for advancing a work carrier in forward and reverse directions relative to the tool, pump means for supplying fluid to operate said motors, control means for causing repeated advance and return cycles of the tool operating motor, control means for causing said work carrier motor to advance step by step a predetermined distance in sequence with movements of the tool operating motor, and means rendered effective at the completion of said step-by-step advance of the work carrier motor for rendering the latter effective to return step by step in the opposite direction in sequence with movements of the tool operating cylinder.

FERRIS T. HARRINGTON.